UNITED STATES PATENT OFFICE.

LEO WALLERSTEIN, OF NEW YORK, N. Y.

METHOD OF TREATING BEER OR ALE.

997,873.　　　Specification of Letters Patent.　　Patented July 11, 1911.

No Drawing.　　Application filed May 9, 1911.　Serial No. 626,015.

*To all whom it may concern:*

Be it known that I, LEO WALLERSTEIN, a subject of the Emperor of Germany, residing at New York, in the county of New York and State of New York, have invented certain new and useful Improvements in Methods of Treating Beer or Ale, of which the following is a specification.

In my prior applications (Serial No. 554,645, filed April 11, 1910, and divisional applications thereof), I have described a method of treating beer or ale for the purpose of increasing its stability at ordinary temperatures or when chilled, said method consisting essentially in adding to the beer or ale, at any stage of the brewing after the cooling of the wort and before bottling, a preparation containing a proteolytic enzym which is active in slightly acid media and which is capable of so modifying the proteids of the beer or ale as to prevent their coagulation or separation when the beer or ale is stored at ordinary temperatures, or is chilled or cooled, even after pasteurization. As described in said prior applications, I may use for this purpose proteolytic enzyms derived from malt, from the gastric secretions of mammals, or from various other sources, as for example papain (from the papaw) or bromelin (from the fruit of the pineapple.)

The present invention relates to the treatment of beer or ale for the purpose of increasing its stability at normal or lower temperatures, by adding thereto a preparation containing in a state of activity a proteolytic enzym extracted from yeast.

It is well known that the living yeast plant contains a large number of enzyms, or of zymogens convertible into enzyms, among them enzyms capable of proteolytic effects; and it has been heretofore established that although the proteolytic enzyms of yeast never diffuse from the living cells, they may nevertheless be extracted in a state of activity after the cells have been killed by appropriate methods, as for example by the action of chloroform or by mechanical disruption.

An effective method for extracting the enzyms from yeast has been described by Buchner (*Die Zymasegärung,* Buchner, Buchner & Hahn, Munich and Berlin, 1903), this method consisting essentially in removing the excess moisture from the living yeast by pressure, and then grinding the cells mixed with quartz sand and infusorial earth, under such conditions that the cells are disrupted and the contained juice or cell-sap is absorbed by the infusorial earth, from which it may thereafter be extracted under heavy pressure, in a hydraulic or other press. The cell-sap thus obtained may be employed directly for the purposes of this invention; or it may be evaporated *in vacuo* at temperatures not exceeding 40° C. to a dry mass wherein the enzyms are still active. The cell-sap is however rich in coagulable proteids, and when added directly to the beer renders it turbid, owing to the coagulation of these proteids; the precipitate so formed is however readily removed by filtration or sedimentation, while the proteolytic enzyms persist in solution, and during the following pasteurization exert the desired modifying action upon the remaining coagulable proteids.

Instead of adding the crude cell-sap to the beer and separating the resulting precipitate as above described, the following procedure may be employed: One part of the crude cell-sap is added to nine parts of a 0.1% solution of hydrochloric acid, and the mixture is permitted to stand, preferably at about 37° C., until the proteids coagulate, which may require as much as two hours. The clear liquid is then filtered off or otherwise separated from the albuminous matter. This clear liquid contains the active enzym and may be added to the beer, or if desired the liquid may be dialyzed at a low temperature, preferably not exceeding 5° C., in order to eliminate the hydrochloric acid, after which the solution may be evaporated to dryness *in vacuo* as in the case of the crude cell-sap.

The proportion of enzym preparation to be added to the beer or ale will depend upon the activity of the preparation and also upon the amount of coagulable albumens in the beer, and may in all cases be readily ascertained by simple experiment. For example I have found it sufficient in certain cases to apply the cell-sap derived from one pound of compressed brewers' yeast to the treatment of 150 to 300 gallons of beer. This proportion is however subject to considerable variations according to the specific conditions, and it will be understood that in case the dry preparation is used the quantity will be proportionately reduced, and also that when the dilute extract is used a proportionate increase in the quantity will be required.

The addition of the proteolytic enzym may be made at any period of the brewing subsequent to the cooling of the wort but preferably after the conclusion of the main fermentation. Thus it may be added during storage or shortly before bottling, for example immediately before the filtration which precedes bottling. The invention is particularly advantageous as applied to the treatment of bottled beers or ales which are to be pasteurized.

I claim:—

1. In the art of brewing, the step which consists in extracting from yeast a proteolytic enzym in a state of activity, and adding the same to beer or ale, before bottling.

2. In the art of brewing, the step which consists in extracting from yeast a proteolytic enzym in a state of activity, adding the same to beer or ale, before bottling, and subsequently pasteurizing.

In testimony whereof, I affix my signature in presence of two witnesses.

LEO WALLERSTEIN.

Witnesses:
C. P. TOWNSEND,
E. DANIELS.